United States Patent [19]
Ichihara

[11] Patent Number: 6,097,715
[45] Date of Patent: Aug. 1, 2000

[54] CDMA COMMUNICATION SYSTEM

[75] Inventor: Masaki Ichihara, Tokyo, Japan

[73] Assignee: NEC Corporation, Japan

[21] Appl. No.: 08/919,003

[22] Filed: Aug. 27, 1997

[30] Foreign Application Priority Data

Aug. 29, 1996 [JP] Japan ..................................... 8-228611

[51] Int. Cl.[7] .............................................. H04B 7/216
[52] U.S. Cl. ............................................ 370/342; 370/441
[58] Field of Search .................................... 455/383, 522, 455/69; 370/355, 342, 465, 318, 375, 200, 491, 496, 441; 375/200, 206, 260

[56] References Cited

U.S. PATENT DOCUMENTS 5,339,330  8/1994  Mallinckrodt ........................... 375/200
5,809,061  9/1998  Shea et al. ............................... 375/206

*Primary Examiner*—Salvatore Cangialosi
*Attorney, Agent, or Firm*—Ostrolenk, Faber, Gerb & Soffen, LLP

[57] ABSTRACT

In a CDMA communication system, a base station includes a spreader 11 for spreading a frequency of a standby control signal by using a short code, a differential coder 12 for differential-coding the spread standby control signal and adders 13a and 13b for adding the differential-coded signal to an I channel signal and a Q channel signal, respectively, and a terminal station includes a differencial detector 14 for differencial-detecting a receiving signal and a matched filter 15 for inverse-spreading a differencial-detected baseband signal, wherein a complete intermittent operation of the terminal station in a standby state is realized and a power consumption of the terminal station is reduced by transmitting the standby control signal containing an information indicative of the terminal station and an intermittent interval from the base station to the terminal station.

38 Claims, 7 Drawing Sheets

CDMA COMMUNICATION SYSTEM

BACKGROUND OF THE INVENTION

1. Field of the Invention

The present invention relates to an information communication based on Code Division Multiple Access (referred to as "CDMA", hereinafter) scheme and, particularly, to a communication system in which a terminal station performs an intermittent receiving operation during a standby period thereof.

2. Description of the Related Art

A standard IS95 proposed by Qualcomm Inc. has been standardized in the U.S.A., which is known as a typical one of the CDMA scheme. This standardized scheme is publicly opened from TIA (Telecommunication Industries Association) of the U.S.A.

IS95 will be described briefly with reference to FIG. 1. In a base station, a control signal and a traffic signal are similarly spread-spectrum-processed by a spreader 51 and modulated by a modulator 52 and a resultant signal is transmitted from a transmitter (TX) 53 through an antenna 54, as shown in FIG. 1. In a terminal station, the signal received by an antenna 55 and a receiver (RX) 56 is demodulated by a demodulator 57. Output signals of the demodulator 57 are inverse-spread-spectrum-processed by a signal processing circuit 58 to recover the control signal and the traffic signal.

A transmitting part of the base station which employs IS95 will be described in detail with reference to FIG. 2. As shown in FIG. 2, there are a control channel which includes a pilot channel for transmitting a pilot signal, a sync channel for transmitting a sync signal and a paging channel for transmitting a paging signal and a traffic channel for transmitting the traffic signal for controlling a data transfer and a communication signal, as signal channels from the base station to the terminal station. The signals except the pilot signal are input to coders 61 dedicated to the respective channels. Each coder 61 processes the signal input thereto in predetermined manner such as error correcting coding, interleaving, ciphering, etc.

The pilot signal and outputs of the coders 61 are input to respective multipliers 62 to which different spread spectrum codes are also input. The multipliers 62 multiply the pilot signal and the output signals of the corresponding coders 61 with the respective spread spectrum codes to spread frequencies of these signals. The spread spectrum codes used in this stage may be simple short codes and, for example, codes $W_x$ selected from Walsh code system which is well known as the quadrature code system may be used.

The signals whose frequencies are spread by the respective multipliers 62 are input to a combiner 63 and combined with each other thereby. An output of the combiner 63 is branched to an I channel signal and a Q channel signal which are supplied to multipliers 64a and 64b, respectively. The I channel signal is scrambled by multiplying it with a PN code (indicated by "IchPN" in FIG. 2) for the I channel signal by the multiplier 64a. The Q channel signal is scrambled by multiplying it with a PN code (long code and indicated by "QchPN" in FIG. 2) for the Q channel signal by the multiplier 64b.

The scrambled I and Q signals whose high harmonics are removed by respective low-pass filters 65 are input to a quadrature modulator 66. The quadrature modulator 66 phase-modulates a carrier by using the I and Q signals input thereto. A signal which is phase-modulated is transmitted from a transmitter 67 through an antenna 68.

Now, a receiving part of the terminal station employing IS95 will be described in detail with reference to FIG. 3.

In the terminal station, a receiving signal received by an antenna 71 and a receiver (RX) 72 is input to a quadrature demodulator 73, as shown in FIG. 3. The quadrature demodulator 73 quadrature-demodulates the receiving signal to recover the I channel signal and the Q channel signal of a base-band signal. The demodulated I and Q channel signals are input to respective low-pass filters 74. The I and Q channel signal output from the low-pass filters 74 are input to respective A/D converters 75 by which the signals are converted into digital signals.

A digital signal processing circuit 76 decodes the control signal and the traffic signal from the input digital signals under control of a CPU 77. In detail, the digital signal processing circuit 76 finds out a timing of the pilot signal by means of a pilot search engine. With the timing thus found, it is possible to establish a synchronization of timings of the scrambles by the PN code for the I channel signal and the PN code for the Q channel signal.

Thereafter, the sync signal is decoded by performing an inverse spreading and Rake synthesis on the basis of the timing thus found. With this, it becomes possible to establish a frame synchronization and the spreading code used in the paging channel is clarified.

Then, the signal of the paging channel is decoded by using the spreading code thus clarified. In the standby state, the CPU 77 continuously monitors the paging channel. In the communication state, the signal on the traffic channel is decoded on the basis if the information on the paging channel.

In IS95, however, it is difficult to reduce a power consumption since the digital signal processing circuit has to be always operable to trace the pilot signal and to monitor the paging channel, even when the terminal station is in the standby state. Further, since the pilot signal is continuously traced and the synchronization is to be held, a complete intermittent operation is impossible in the standby state.

Other prior arts of the CDMA communication system than IS95 are disclosed in Japanese Patent Application Laid-open Nos. Hei 1(1989)-305741, Hei 5(1993)-130069 and Hei 5(1993)-191375.

Japanese Patent Application Laid-open No. Hei 1(1989)-305741 discloses a spectrum spreader in which an information to be transmitted and a sync signal are frequency-spread by different spread codes and the diffused information and the sync signal are multiplexed and transmitted. The disclosed technique is also utilized by IS95 and can not solve the above mentioned problem. Japanese Patent Application Laid-open No. Hei 5(1993)-130069 discloses a multiple connection control device for reducing power consumption. This device is constructed such that sync catching/holding means are provided correspondingly to a plurality of control signals, respectively, to continuously monitor all of the control signals and, thus, it can not realize an intermittent operation. Although Japanese Patent Application Laid-open No. Hei 5(1993)-191375 also discloses a receiver of a spectrum spread system for the purpose of reducing power consumption during an intermittent operation, there is neither description nor suggestion of reduction of power consumption during intermittent operation in its specification.

The present invention has an object, in the CDMA communication system, to realize a complete intermittent operation of a terminal station during a standby state while reducing power consumption during the intermittent operation.

SUMMARY OF THE INVENTION

According to the present invention, a CDMA communication system for a CDMA communication between a base station and a terminal station is provided, which is featured by comprising, in addition to a CDMA channel for transmitting a predetermined signal, a standby control channel for transmitting a standby control signal for controlling an intermittent receiving operation of the terminal station during the standby period such that the base station controls the intermittent receiving operation of the terminal station during the standby period thereof.

The base station comprises means for modulating the standby control signal according to a modulation scheme which is different from that of the predetermined signal and transmitting the modulated standby control signal. Further, the terminal station comprises means for demodulating the standby control signal according to a demodulation scheme which is different from that of the predetermined signal. The base station adds an information indicative of an identification number of the terminal station and an intermittent receiving interval thereof to the standby control signal and transmits the standby control signal added with the information. The terminal station stops its receiving operation for a time indicated by the intermittent receiving interval contained in the information of the standby control signal when the identification number thereof is contained in the standby control signal. A split phase code is used as the standby control signal.

In more detail, the base station includes first spreader means for spreading the predetermined signal by using a first spread code, first modulator means for modulating the predetermined signal spread by the first spreader means, second spreader means for spreading the standby control signal by using a second spread code, second modulator means for modulating the standby control signal spread by the second spreader means and transmitting means for transmitting outputs of the first and second modulator means to the terminal station. The second modulator means includes a differential coding circuit and may include the first modulator means.

The terminal station includes receiver means for receiving the signal transmitted from the base station, first demodulator means for demodulating the predetermined signal of the signal received by the receiver means, first inverse spreader means for inverse-spreading the predetermined signal demodulated by the first demodulator means by using a first inverse spread code, first decoder means for decoding the predetermined signal inverse-spread by the first inverse spreader means, second demodulator means for demodulating the standby control signal of the signal received by the receiver means, second inverse spreader means for inverse-spreading the standby control signal demodulated by the second demodulator means and second decoder means for decoding the standby control signal inverse-spread by the second inverse spreader means. A differencial detector circuit may be used as the second demodulator means and a matched filter constructed with an SAW (surface acoustic wave) device may be used as the second inverse spreader means.

When the terminal station is in a standby state, the first modulator means, the first inverse spreader means and the first decoder means of the terminal station are stopped to operate and the receiver means, the second demodulator means, the second inverse spreader mean and the second decoder means are stopped to operate only for a time determined by the standby control signal.

In the present invention, the efficient intermittent operation is realized in the terminal station by utilizing a channel which is demodulated easily and dedicated to the standby control. It is possible to substantially reduce the power consumption of the terminal station in the standby state if it can effectively receive the signal intermittently. Therefore, in a case where the terminal station is driven by a battery as in a portable telephone set, it is possible to substantially elongate the battery life thereof.

The standby control signal is spread by only a short code in order to facilitate its demodulation, modulated by the simplest modulation scheme such as, for example, BPSK, and transmitted to the terminal station. The terminal station delays and detects the received standby control signal and inverse-spreads it by the matched filter such as SAW device whose power consumption is small. A result of the inverse spreading can be evaluated by a simple decision circuit. Further, when the split phase signal is used as the standby control signal, a bit synchronization can be established easily.

DETAILED DESCRIPTION OF THE PREFERRED EMBODIMENT

Figure 1:
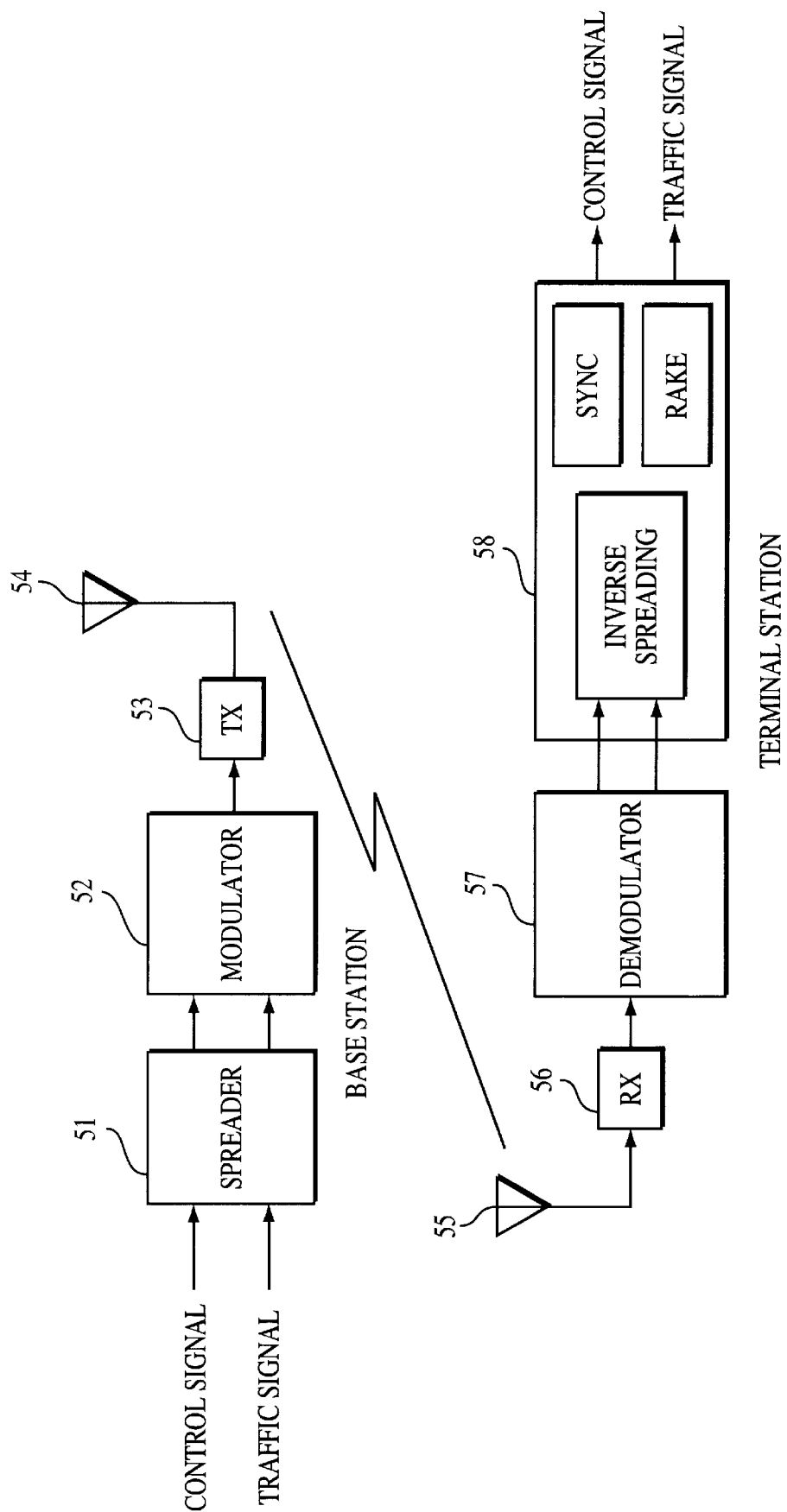
FIG. 1 is a schematic block circuit diagram showing a construction of a conventional CDMA communication system.
Figure 2:
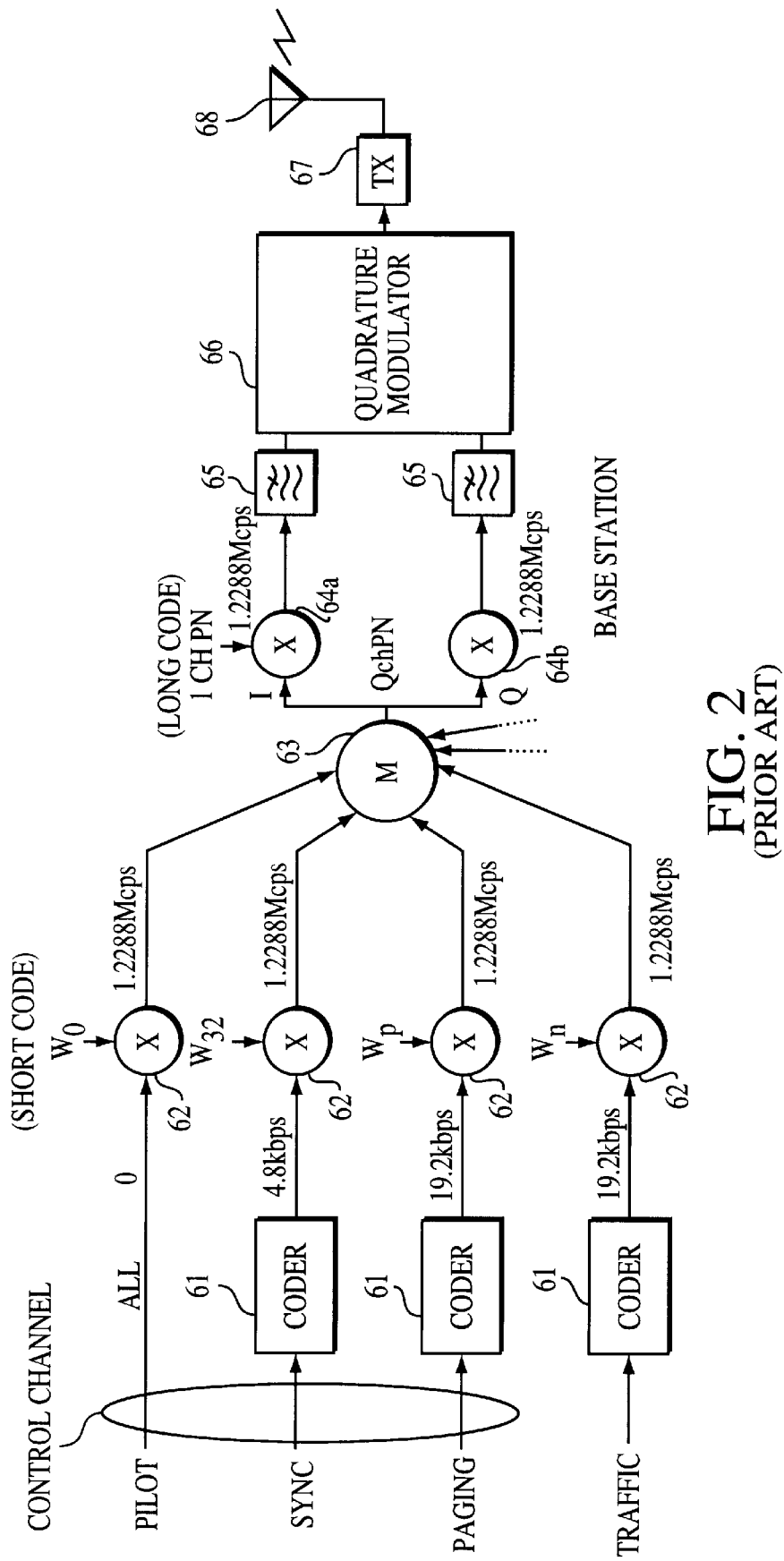
FIG. 2 is a detailed block circuit diagram showing a construction of a conventional base station of the CDMA communication system.
Figure 3:
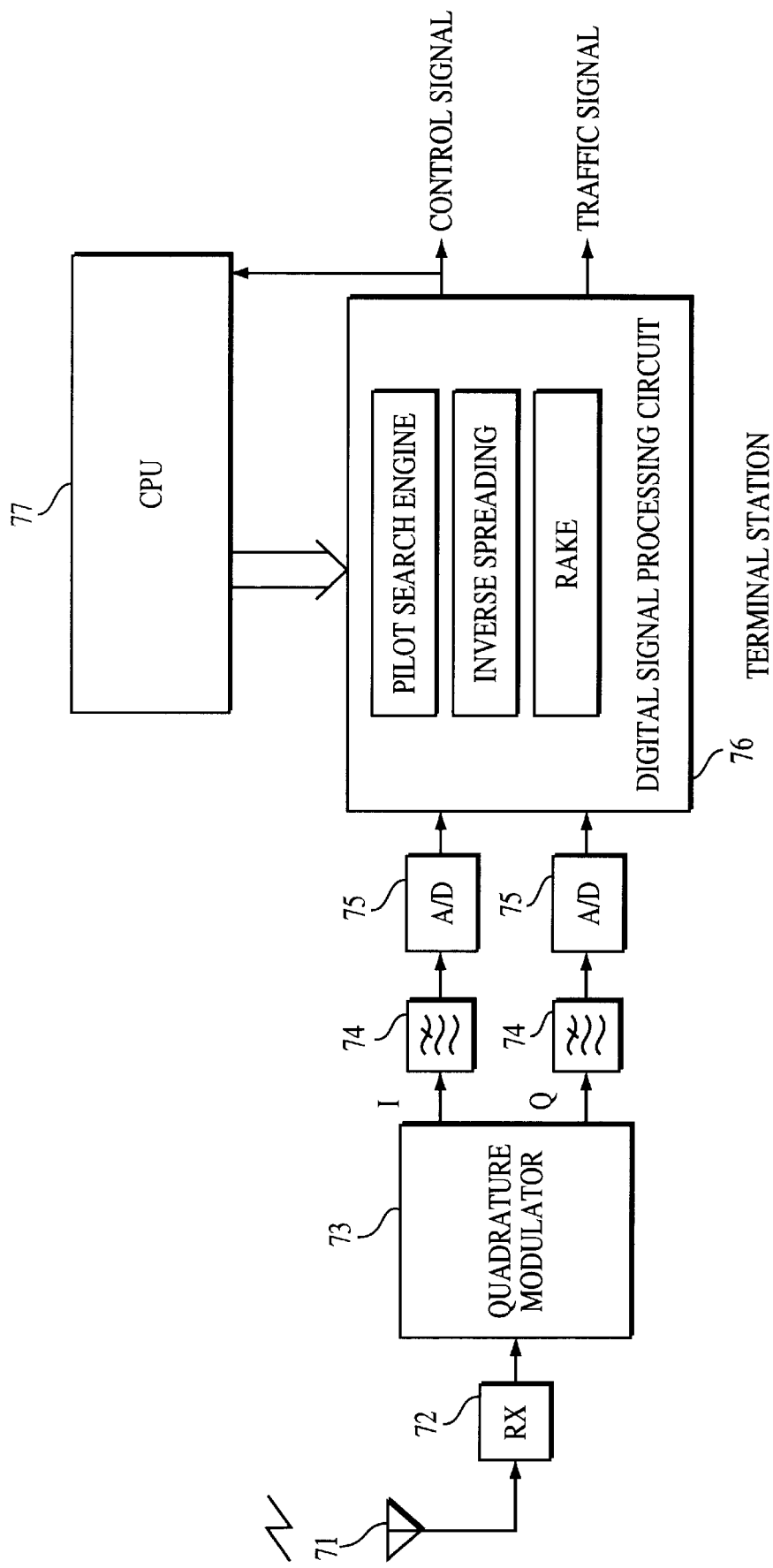
FIG. 3 is a detailed block circuit diagram showing a construction of a conventional terminal station of the CDMA communication system.
Figure 4:
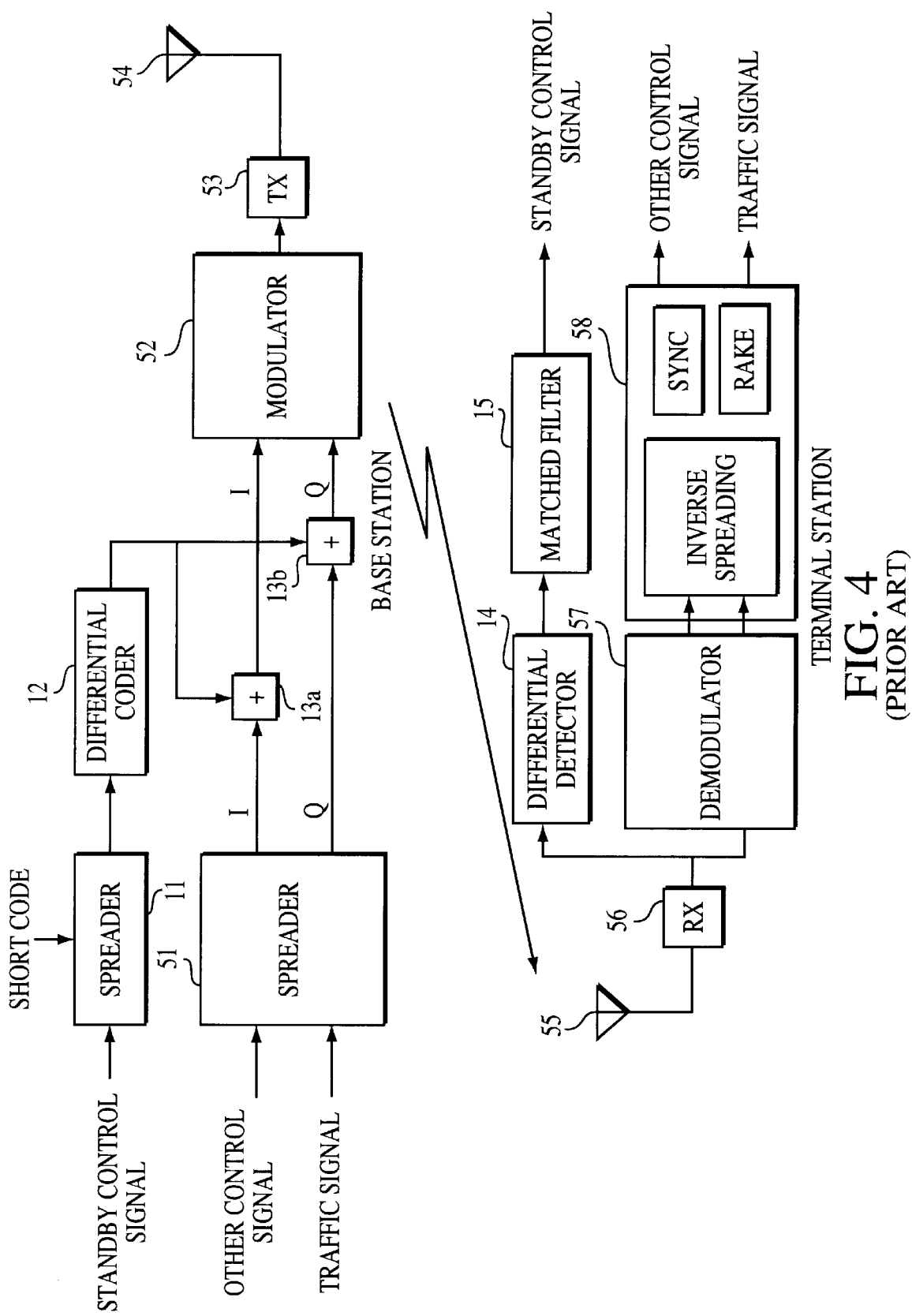
FIG. 4 is a block circuit diagram showing a construction of an embodiment of the present invention.

FIG. 4 shows an embodiment of the present invention. Constructive components of the embodiment shown in FIG. 1, which are the same as those shown in FIGS. 1 to 3, will be depicted by the same reference numerals as those used in FIGS. 1 to 3, respectively, without detailed description thereof.

In the CDMA communication system shown in FIG. 4, a base station includes, in addition to a spreader 51, a modulator 52, a transmitter circuit 53 and an antenna 54, a spreader 11 for frequency-spreading a standby control signal (a signal of a standby control channel), a differential coder 12 for differential coding the frequency-spread signal and adders 13a and 13b for adding the differential coded signal to an I channel signal and a Q channel signal output from the spreader 51, respectively. On the other hand, a terminal station shown in FIG. 4 includes, in addition to an antenna 55, a receiver circuit 56, a demodulator 57 and a signal processing circuit 58, a differencial detector 14 for differencial-detecting a received signal and converting it into a baseband signal and a matched filter for inverse-spreading the baseband signal.

In order to facilitate a demodulation in the terminal station, the spreader 11 frequency-spreads the standby control signal by using a simple short code. The frequency-spread standby control signal is differentially coded by the differential coder and branched to two routes. Other control signals and a traffic signal are frequency-spread by the spreader 51 and output the I channel signal and the Q channel signal as in the conventional system shown in FIG. 1. The adders 13a and 13b add the I channel signal and the Q channel signal to the differential-coded and branched standby control signals, respectively. Thereafter, the modulator 52 quadrature-modulates the I channel signal and the Q channel signal which have the standby control signals added. Since the standby control signals are added to the I channel signal and the Q channel signal evenly, it can be transmitted by using the simplest BPSK modulation. The quadrature-modulated signal is transmitted from the transmitter circuit 53 through the antenna 54.

In the terminal station, the receiving signal received by the receiver circuit 56 through the antenna 55 is branched to two routes. One of the branched receiving signals is demodulated by the demodulator 57 and processed by the signal processing circuit 58 as in the conventional system. Thus, other control signal than the standby control signal and a traffic signal are obtained. The other one of the branched receiving signal is differencial-detected and converted into the baseband signal of the standby control signal. The baseband signal is inverse-spread by the matched filter 15 corresponding to the short code used in the base station. Thus, the standby control signal is decoded. In order to facilitate the establishment of bit synchronization in the base station, the split phase code can be used as the standby control signal.

In the standby state, the terminal station receives only the standby control signal intermittently. During the terminal station receives the standby control signal, all of the circuits for demodulating and decoding other signals than the standby control signal are stopped to operate, so that the terminal station can continue the standby operation with minimum power consumption.

Figure 5:
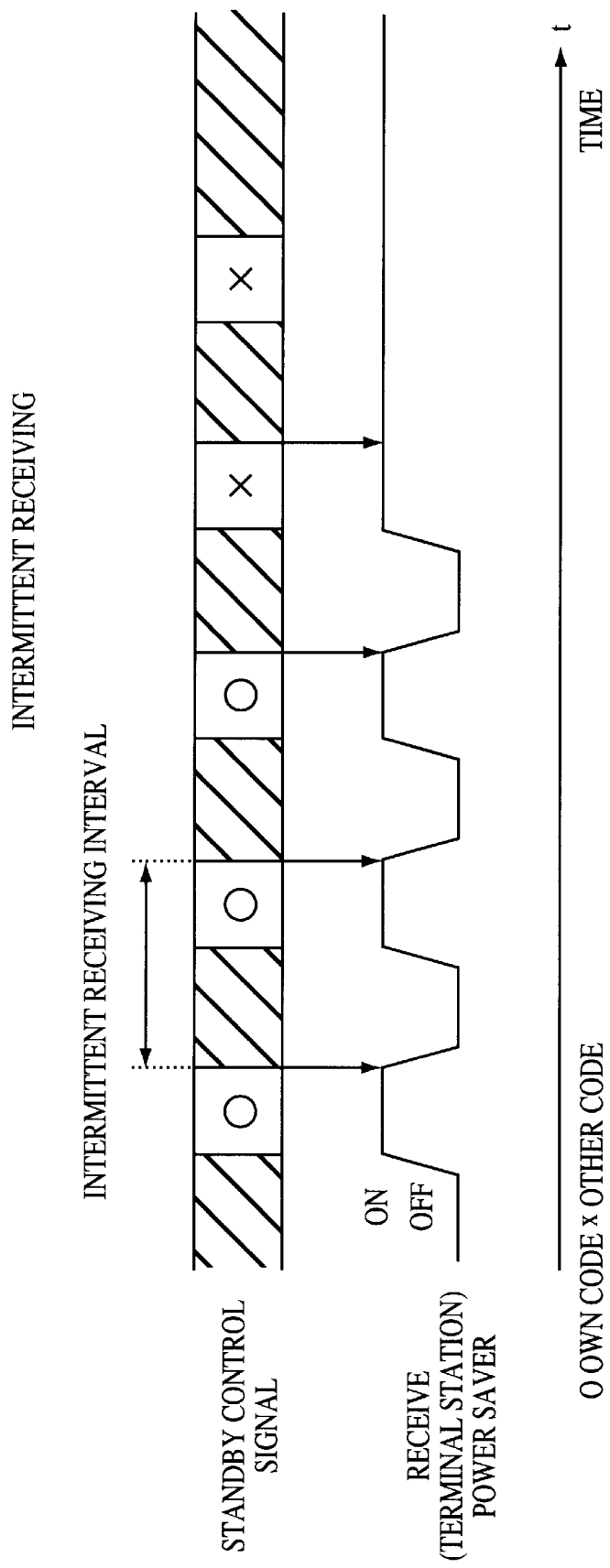
FIG. 5 shows signal waveforms useful to understand an intermittent operation of the terminal station.

FIG. 5 shows signal waveforms useful to understand the operation of the terminal station. In the described embodiment, the base station transmits the standby control signal instructing the stoppage of receiving operation to the terminal station. That is, the base station periodically transmits an identification code identifying the terminal station which should perform an intermittent receiving and an information indicative of an intermittent receiving interval. The terminal station, when it detects the identification code identifying itself in the standby control signal, decodes the intermittent receiving interval information contained in the standby control signal and stops its receiving operation for a time determined by the information.

Figure 6:
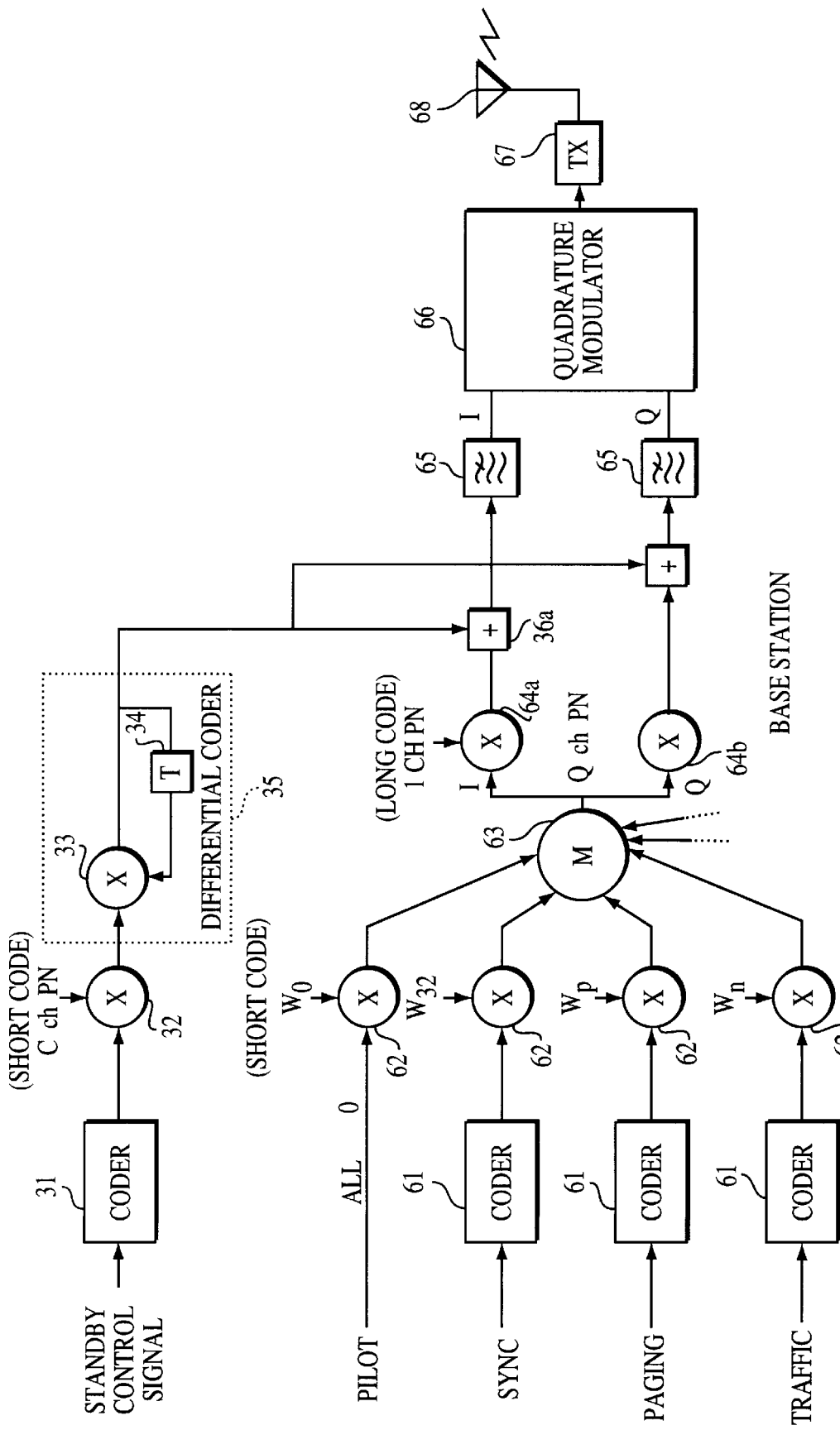
FIG. 6 is a detailed block circuit diagram showing a construction of a base station shown in FIG. 4.

FIG. 6 is a detailed construction of the base station. Constructive components of the embodiment shown in FIG. 6, which are the same as those shown in FIGS. 1 to 3, will be depicted by the same reference numerals as those used in FIGS. 1 to 3, respectively, without detailed description thereof. The base station includes, in addition includes, in addition to the coders 61, the multipliers 62, a combiner 63, multipliers 64a and 64b, low-pass filters 65, an quadrature modulator 66, the transmitter circuit 67 and the antenna 68, a coder 31 for coding the standby control signal and a differential coder 35 including a multiplier 33 and a chip delay circuit 34 and adders 36a and 36b.

The coder 31 adds a simple coding, for example, an error code to the standby control signal and performs a split phase coding which is easy to establish the bit synchronization.

The multiplier 32 multiplies the short code (C channel PN) with the coded standby control signal to perform the frequency spreading. The differential coder 35 converts the frequency-spread signal into a differential code in order to make the terminal station possible to employ a simple delay detection. The adders 36a and 36b function to evenly add the differential code to the I channel signal and the Q channel signal, respectively. Outputs of the adders 36a and 36b are filtered by the low-pass filters 65 and input to the quadrature-modulator 66, respectively. The quadrature-modulator 66 functions to perform the quadrature-modulation by using the I channel signal and the Q channel signal. Thus, the standby control signal is BPSK-modulated. The quadrature-modulated signal is transmitted from the transmitter circuit 67 through the antenna 68.

Figure 7:
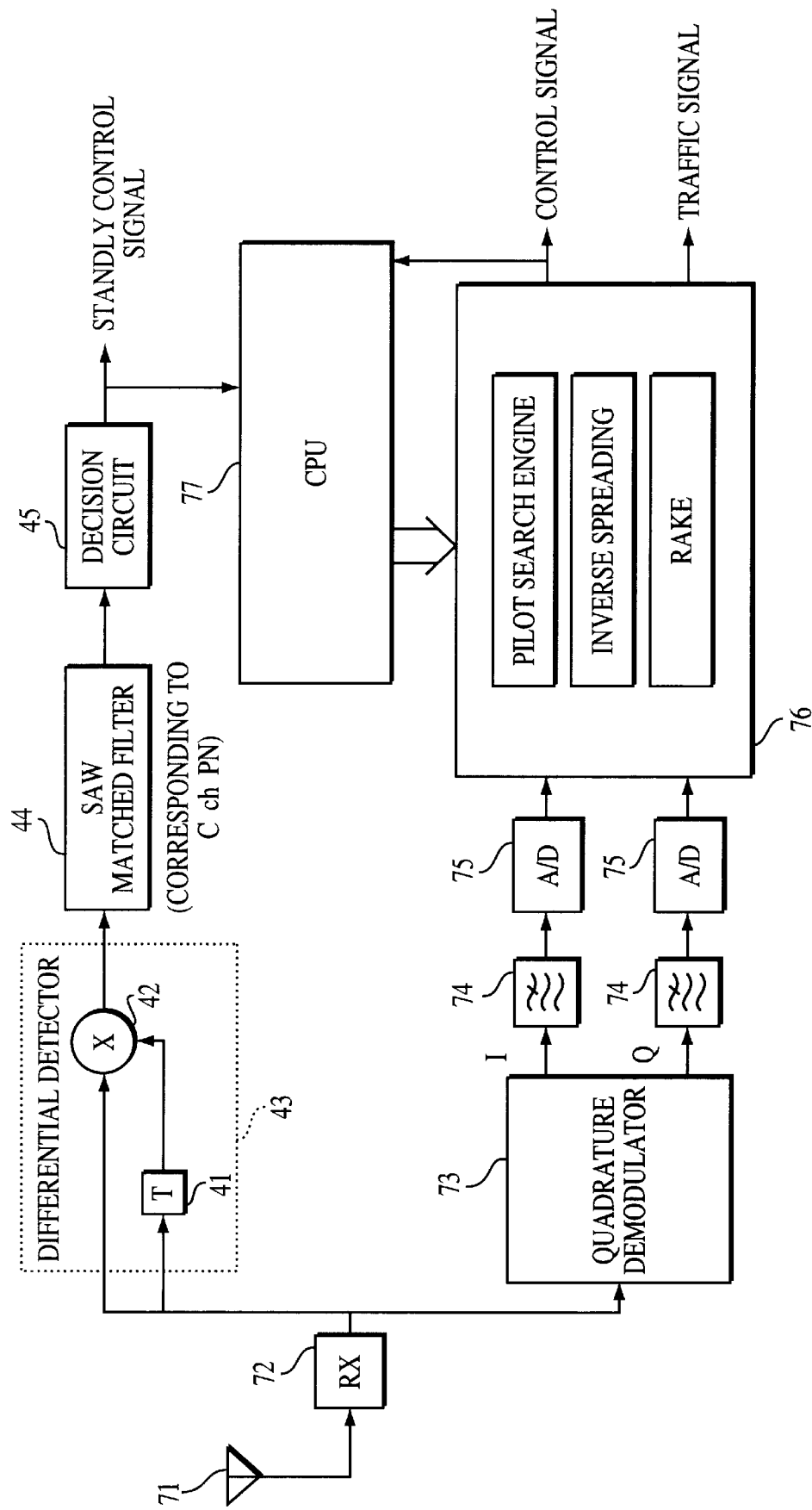
FIG. 7 is a detailed block circuit diagram showing a construction of a terminal station shown in FIG. 4.

FIG. 7 shows the terminal station in detail. The terminal station includes, in addition to the antenna 71, the receiver circuit 72, the quadrature demodulator 73, the A/D converters 75, the digital signal processing circuit 76 and the CPU 77, a delay detector 43 including one-chip delay circuit 41 and a multiplier 42, a matched filter 44 corresponding to the short code (C channel PN) used in the base station and a decision circuit 45.

The receiving signal received by the receiver circuit 72 through the antenna 71 is branched to two routes and input to the quadrature demodulator 73 and the differencial detector 43, respectively. The differencial detector 43 differencial-detects the input receiving signal and demodulates the base-band signal related to the standby control signal. The matched filter 44 comprises a SAW device which does not consume power and inverse-spreads the baseband signal input thereto. The decision circuit 45 decodes the inverse-spread baseband signal. The decoded signal is input to the CPU 77 which controls the intermittent receiving operation of the terminal station on the basis of the standby control signal input thereto.

As described hereinbefore, according to the present invention can realize a complete intermittent operation of the terminal station when the latter is in the standby state. Since the standby control signal received by the terminal station in the receiving state of the intermittent operation is easily demodulated and decoded, the power consumption can be restricted and, therefore, it is possible to elongate the standby time of the terminal station such as portable telephone set which is driven by a battery.

What is claimed is:

1. A CDMA communication system for performing a CDMA communication between a base station and a terminal station, comprising a CDMA channel for transmitting a signal, a standby control channel for transmitting a standby control signal for controlling an intermittent receiving operation of said terminal station during the standby period such that said base station controls the intermittent receiving operation of said terminal station during the standby period thereof.

2. A CDMA communication system as claimed in claim 1, wherein said base station comprises means for modulating the standby control signal according to a modulation scheme which is different from that of the signal and transmitting the modulated standby control signal.

3. A CDMA communication system as claimed in claim 1, wherein said terminal station comprises means for demodulating the standby control signal according to a demodulation scheme which is different from that of the signal.

4. A CDMA communication system as claimed in claim 1, wherein said base station transmits an information indicative of an identification number of said terminal station and an intermittent receiving interval thereof together with the standby control signal and said terminal station stops its receiving operation for a time indicated by the intermittent receiving interval contained in the information of the standby control signal when the identification number thereof is contained in the standby control signal.

5. A CDMA communication system as claimed in claim 1, wherein the standby control signal is transmitted by using a split phase code.

6. A CDMA communication system as claimed in claim 1, wherein said base station comprises first spreader means for spreading a frequency of the signal by using a first spread code, first modulator means for modulating the signal frequency-spread by said first spreader means, second spreader means for spreading a frequency of the standby control signal by using a second spread code, second modulator means for modulating the standby control signal frequency-spread by said second spreader means and transmitter means for transmitting outputs of said first and second modulator means to said terminal station.

7. A CDMA communication system as claimed in claim 6, wherein said second modulator means comprises a differential coding circuit.

8. A CDMA communication system as claimed in claim 6, wherein said second modulator means includes said first modulation means.

9. A CDMA communication system as claimed in claim 1, wherein said terminal station comprises receiver means for receiving the signal transmitted from said base station, first demodulator means for demodulating the signal of the signal received by said receiver means, first inverse-spreader means for inverse-spreading the frequency of the signal demodulated by said first demodulator means by using a first inverse spread code, first decoder means for decoding the signal inverse-spread by said first inverse spreader means, second demodulator means for demodulating the standby control signal of the signal received by said receiver means, second inverse spreader means for inverse-spreading the standby control signal demodulated by said second demodulator means and second decoder means for decoding the standby control signal inverse-spread by said second inverse spreader means.

10. A CDMA communication system as claimed in claim 9, wherein, in the standby state of said terminal station, operations of said first demodulator means, said first inverse spreader means and said first decoder means of said terminal station are stopped.

11. A CDMA communication system as claimed in claim 10, wherein said second demodulator means comprises a differential detector circuit.

12. A CDMA communication system as claimed in claim 9, wherein said second demodulator means comprises a differential detector circuit.

13. A CDMA communication system as claimed in claim 9, wherein said second inverse spreader means comprises a matched filter.

14. A CDMA communication system as claimed in claim 13, wherein said matched filter is constructed with a SAW device.

15. A CDMA communication system as claimed in claim 2, wherein said terminal station comprises means for demodulating the standby control signal according to a demodulation scheme which is different from that of the signal.

16. A CDMA communication system as claimed in claim 2, wherein said base station transmits an information indicative of an identification number of said terminal station and an intermittent receiving interval thereof together with the standby control signal and said terminal station stops its receiving operation for a time indicated by the intermittent receiving interval contained in the information of the standby control signal when the identification number thereof is contained in the standby control signal.

17. A CDMA communication system as claimed in claim 3, wherein said base station transmits an information indicative of an identification number of said terminal station and an intermittent receiving interval thereof together with the standby control signal and said terminal station stops its receiving operation for a time indicated by the intermittent receiving interval contained in the information of the standby control signal when the identification number thereof is contained in the standby control signal.

18. A CDMA communication system as claimed in claim 15, wherein said base station transmits an information indicative of an identification number of said terminal station and an intermittent receiving interval thereof together with the standby control signal and said terminal station stops its receiving operation for a time indicated by the intermittent receiving interval contained in the information of the standby control signal when the identification number thereof is contained in the standby control signal.

19. A CDMA communication system as claimed in claim 2, wherein the standby control signal is transmitted by using a split phase code.

20. A CDMA communication system as claimed in claim 3, wherein the standby control signal is transmitted by using a split phase code.

21. A CDMA communication system as claimed in claim 15, wherein the standby control signal is transmitted by using a split phase code.

22. A CDMA communication system as claimed in claim 4, wherein the standby control signal is transmitted by using a split phase code.

23. A CDMA communication system as claimed in claim 16, wherein the standby control signal is transmitted by using a split phase code.

24. A CDMA communication system as claimed in claim 17, wherein the standby control signal is transmitted by using a split phase code.

25. A CDMA communication system as claimed in claim 18, wherein the standby control signal is transmitted by using a split phase code.

26. A CDMA communication system as claimed in claim 6, wherein said terminal station comprises receiver means for receiving the signal transmitted from said base station, first demodulator means for demodulating the signal of the signal received by said receiver means, first inverse-spreader means for inverse-spreading the frequency of the signal demodulated by said first demodulator means by using a first inverse spread code, first decoder means for decoding the signal inverse-spread by said first inverse spreader means, second demodulator means for demodulating the standby control signal of the signal received by said receiver means, second inverse spreader means for inverse-spreading the standby control signal demodulated by said second demodulator means and second decoder means for decoding the standby control signal inverse-spread by said second inverse spreader means.

27. A CDMA communication system as claimed in claim 1, wherein said base station comprises a modulator which modulates the standby control signal according to a modulation scheme which is different from that of the signal and transmits the modulated standby control signal.

28. A CDMA communication system as claimed in claim 1, wherein said base station comprises a first spreader which spreads a frequency of the signal by using a first spread code, a first modulator which modulates the signal frequency-spread by said first spreader, a second spreader which spreads a frequency of the standby control signal by using a second spread code, a second modulator which modulates the standby control signal frequency-spread by said second spreader, and a transmitter which transmits outputs of said first and second modulators to said terminal station.

29. A CDMA communication system as claimed in claim 28, wherein said second modulator comprises a differential coding circuit.

30. A CDMA communication system as claimed in claim 28, wherein said second modulator includes said first modulator.

31. A CDMA communication system as claimed in claim 1, wherein said terminal station comprises a demodulator which demodulates the standby control signal according to a demodulation scheme which is different from that of the signal.

32. A CDMA communication system as claimed in claim 1, wherein said terminal station comprises a receiver which receives the signal transmitted from said base station, a first demodulator which demodulates the transmitted signal of the signal received by said receiver, a first inverse-spreader which inverse-spreads the frequency of the signal demodulated by said first demodulator by using a first inverse spread code, a first decoder which decodes the signal inverse-spread by said first inverse spreader, a second demodulator which demodulates the standby control signal of the signal received by said receiver, a second inverse spreader which inverse-spreads the standby control signal demodulated by said second demodulator, and a second decoder which decodes the standby control signal inverse-spread by said second inverse spreader.

33. A CDMA communication system as claimed in claim 32, wherein, in the standby state of said terminal station, operations of said first demodulator, said first inverse spreader and said first decoder of said terminal station are stopped.

34. A CDMA communication system as claimed in claim 33, wherein said second demodulator comprises a differential detector circuit.

35. A CDMA communication system as claimed in claim 32, wherein said second demodulator comprises a differential detector circuit.

36. A CDMA communication system as claimed in claim 32, wherein said second inverse spreader comprises a matched filter.

37. A CDMA communication system as claimed in claim 2, wherein said terminal station comprises a demodulator which demodulates the standby control signal according to a demodulation scheme which is different from that of the signal.

38. A CDMA communication system as claimed in claim 6, wherein said terminal station comprises a receiver which receives the signal transmitted from said base station, a first demodulator which demodulates the transmitted signal of the signal received by said receiver, a first inverse-spreader which inverse-spreads the frequency of the signal demodulated by said first demodulator by using a first inverse spread code, a first decoder which decodes the signal inverse-spread by said first inverse spreader, a second demodulator which demodulates the standby control signal of the signal received by said receiver, a second inverse spreader which inverse-spreads the standby control signal demodulated by said second demodulator, and a second decoder which decodes the standby control signal inverse-spread by said second inverse spreader.

* * * * *